United States Patent [19]

Bhatia et al.

[11] Patent Number: 4,567,213

[45] Date of Patent: Jan. 28, 1986

[54] INK JET PRINTING COMPOSITION

[75] Inventors: Yog R. Bhatia, Glen Ellyn; Herman Stallworth, Chicago, both of Ill.

[73] Assignee: Videojet Systems International, Inc., Elk Grove Village, Ill.

[21] Appl. No.: 543,828

[22] Filed: Oct. 20, 1983

[51] Int. Cl.$^4$ ...................... C09D 11/02; C09D 11/10
[52] U.S. Cl. ..................................... 523/160; 106/22; 524/356; 524/389
[58] Field of Search ................ 524/389, 356; 523/160; 106/20, 22, 19

[56] References Cited

U.S. PATENT DOCUMENTS 4,210,566  7/1980  Murray ............................... 523/451
4,260,531  4/1981  Wachtel et al. ...................... 524/389

Primary Examiner—Amelia B. Yarbrough
Attorney, Agent, or Firm—McDougall, Hersh & Scott

[57] ABSTRACT

An ink composition for use in ink jet printing to print images on a substrate, the composition being formulated to include, as the resin component, a styrene-acrylic acid copolymer having a molar ratio of styrene to acrylic acid ranging from about 1 to about 4, a soluble dye, a solvent system including a lower alkanol and a lower aliphatic ketone, and, optionally, an evaporation retardant. The composition of the invention has a pH in the range of 1 to about 7 and contains less than about 5% water for use in printing on a variety of substrates.

9 Claims, No Drawings

INK JET PRINTING COMPOSITION

This invention relates to ink jet printing, and more specifically, to an ink composition for use in ink jet printing which has improved adherence to printing substrates.

Ink jet printing is now well known, and is a technique by which printing is effected without contact between the printing device and the substrate on which the printed characters are deposited. Briefly described, ink jet printing involves the technique of projecting a stream of droplets of ink to a surface and controlling them electronically so that the droplets are caused to form a printed image. That technique of non-contact printing is particularly well suited for applications of printing on irregularly shaped surfaces, including, for example, the bottom of beverage containers.

The physical characteristics of an ink jet printing ink, as is now well known to the art, must be carefully controlled. For example, ink not actually deposited on the substrate is collected and diverted to an ink return tank. Thus, it is necessary to maintain the ink level in the equipment to insure that a relatively constant viscosity in the ink composition remains, even though evaporation losses may occur. It is also important to control the physical characteristics of viscosity, electrical resistivity, surface tension, sonic velocity and specific gravity.

Ink jet printing compositions, in general, have been formulated to contain a binder component in the form of a resin, a soluble dye stuff and a solvent. In addition to those basic ingredients, many ink compositions are also formulated to include evaporation retardants to control evaporative losses from the system, resistivity control agents to adjust the electrical resistivity of the ink and other conventional components.

The binder or resin component of the ink composition used in ink jet printing serves the purpose, among others, of promoting adhesion between the printed image and the substrate on which the printing is effected. A variety of resin binders have been used in ink compositions, such as those described in U.S. Pat. No. 4,210,566. In U.S. Pat. No. 4,260,531, there is described an ink jet printing composition for use in the printing on treated or untreated surfaces of plastics in which the resin component is a styrene-acrylic copolymer resin. The composition there described also includes a plasticizer, a modifying resin, a dye, evaporation retardants and a solvent system including water and a lower alkanol.

One of the primary disadvantages of ink compositions of the sort described in the foregoing patent is that the composition contains a substantial quantity of water. As a result, the resin binders used, such as the styrene-acrylic acid copolymer there described, must be water saponifiable, that is, having some solubility in water. The necessity of employing water as a substantial component in the solvent system provides numerous disadvantages, notably the lack of firm adherence to glass and treated metal substrates on which the ink is deposited during the printing operation. In addition, the use of such systems requires organic solvents which must be miscible with water. That, of course, also imposes limitations on the type of dyes which can be used. In compositions of the prior art, it is not possible to use with any degree of success water-insoluble dyes. Finally, water-based inks tend to dry more slowly.

It is accordingly an object of the present invention to provide an ink composition for use in ink jet printing which overcomes the foregoing disadvantages.

It is a more specific object of the present invention to provide an ink composition for use in ink jet printing which is formulated to include a resin capable of being securely bonded to printing substrates which can be formulated in a composition containing minimum quantities of water.

The concepts of the present invention reside in an ink composition for ink jet printing which is formulated to include a styrene-acrylic acid copolymer having a molar ratio of styrene to acrylic acid ranging from 1 to about 4. The styrene-acrylic acid copolymer used in the practice of the present invention is in acid form, that is, containing free carboxyl groups. Thus, unlike the prior art use of such copolymers wherein the acid groups are neutralized by reaction with an amine or ammonia, the copolymers employed in the practice of this invention contain free carboxyl groups.

Thus, the copolymers employed in the practice of this invention contain randomly distributed styrene groups and acrylic acid groups as shown below:

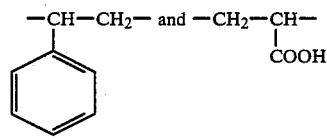

This is in contrast to styrene-acrylic acid copolymers employed in the prior art which have typically included the same styrene groups randomly distributed throughout the molecule but also neutralized acrylic acid groups as represented by the formula:

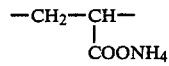

The neutralized acid groups have thus been necessary to maintain an alkaline pH above 7 and to provide the necessary water solubility.

In the composition of this invention, however, use is made of a minimum quantity of water, generally less than 5% and preferably less than 2%. The composition is thus maintained at a pH ranging from 1 to 7, thus insuring that the styrene-acrylic acid copolymer remains in the acid form.

In the practice of the invention use is made of a styrene and acrylic acid in a mole ratio of styrene to acrylic acid ranging from 1 to 4, and preferably 1.5 to 2.5. Such copolymers are commercially available, and include Joncryl 67 marketed by S. C. Johnson and Sons, a copolymer prepared by reacting two moles of styrene with about one mole of acrylic acid.

It is also possible, in accordance with the practice of the present invention, to employ copolymers of styrene with substituted acrylic acids, and particularly an acrylic acid substituted with a lower alkyl group. Such acrylic acids have the general structure:

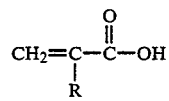

wherein R is a lower alkyl group containing 1 to 5 carbon atoms, such as methyl, ethyl, n-propyl, isopropyl, n-butyl, 1-methylpropyl and 2-methyl propyl. Of these alkyl-substituted acids, methacrylic acid is frequently preferred.

It is also possible, and sometimes desirable, to formulate the ink composition to include modifiers for the styrene-acrylic acid binder. The modifier preferred for use in the present composition is rosin oil or rosin esters, which may be present in an amount ranging from 0 to 15% by weight, and preferably 0 to 6% by weight.

As will be appreciated by those skilled in the art, the ink composition of the present invention is also formulated to include conventional components typically used in ink jet printing ink compositions. For example, use is made of a soluble dye to impart the desired color to the printed images and a solvent system. In accordance with the concepts of the present invention, the solvent system employed is preferably a combination of a lower alkanol containing 1 to 3 carbon atoms (e.g., methanol, ethanol, propanol, etc.) and a lower aliphatic ketone. Typical ketones contain 2 to 6 carbon atoms and are represented by such solvents as acetone, dimethyl ketone, methyl ethyl ketone, methyl propyl ketone, methyl isobutyl ketone and ethyl propyl ketone. In the preferred practice of the present invention, the alkanol solvent is present in an amount ranging from 10 to 85%, and preferably 20 to 40% by weight, while the ketone is present in an amount ranging from 10 to 60%, and preferably 20 to 40%.

The amount of the dye employed in the practice of the invention is not critical and can be varied within relatively broad ranges. Typical compositions contain 0.5 to 8% by weight, and preferably 1 to 5% of the soluble dye. A variety of basic dyes can be used to impart the desired color to the composition. Representative dyes include basic violet 10 and basic violet 3.

While not essential to the practice of the invention, the ink composition of this invention can also be formulated to include evaporation retardants for the purpose of retarding evaporation of the solvents. Such retardants are conventional in ink jet printing compositions. In general, it is preferred to employ, when use is made of an evaporation retardant, an evaporation retardant in the form of a glycol ether, a glycol ester or combinations thereof. Representative materials include ethylene glycol, monomethyl ether, ethylene glycol dimethyl ether, ethylene glycol monoether ether, ethylene glycol diethyl ether, ethylene glycol monobutyl ether, ethylene glycol monophenol ether, ethylene glycol mono-2-ethylbutyl ether, diethylene glycol monomethyl ether, diethylene glycol monoethyl ether, ethylene glycol monomethyl ether acetate, ethylene glycol monoethyl ether acetate, diethylene glycol monomethyl ether acetate, propylene glycol methyl ether and dipropane glycol methyl ether.

When present, the evaporation retardant is present in an amount up to 50% by weight based on the weight of the composition, and preferably 5 to 15% by weight.

It is also desirable, in the practice of the invention, to formulate the ink to include amine salt additives for the purpose of promoting stability and resistivity in the composition. Good results have been obtained by using, as a soluble organic salt, hydroxyl amine hydrochloride or dimethyl amine hydrochloride in amounts ranging from 0 to 2% by weight, and preferably 0 to 1% by weight, to stabilize and control the resistivity of the ink composition.

As will be appreciated by those skilled in the art, the ink composition of the invention may also be formulated to include one or more surfactants to improve the compatibility of the various components of the ink composition. Preferred are nonionic surfactants, and particularly oxyalkylated phenols such as nonyl-phenoxypolyethoxy ethanol (marketed by Rohm & Haas under the trademark Triton N 101). Where present, the surfactant is used in an amount ranging from 0 to 10% by weight, and preferably 0 to 5% by weight.

The ink compositions of this invention have the following physical properties.

| | Physical Properties | |
| --- | --- | --- |
| | Broad range | Preferred range |
| pH | 1-7 | 2-5 |
| Viscosity (cp at 25° C.) | 1-10 | 1.5-2.5 |
| Resistivity (ohm-cm) | 10-3000 | 500-1500 |
| Sonic velocity (m/sec) | 1100-1400 | 1200-1300 |

Having described the basic concepts of the invention, reference is now made to the following examples which are provided by way of illustration, and not by way of limitation, of the practice of the invention in formulating ink compositions.

EXAMPLE 1

An ink composition is formulated by mixing the following ingredients in the order set forth below.

| | Parts by weight |
| --- | --- |
| Methanol | 425.7 |
| Methyl ethyl ketone | 307.0 |
| Ethyleneglycol methyl ether | 89.0 |
| Deionized water | 14.7 |
| Methyl ester of rosin | 13.5 |
| Styrene-acrylic acid copolymer (Joncryl 67) | 129.5 |
| Dimethylamine hydrochloride | 0.7 |
| Basic Violet 10 dye | 5.0 |
| Basic Violet 3 dye | 15.0 |

After filtering, the ink was found to have the following physical properties:

| | |
| --- | --- |
| pH | 2.1 |
| Viscosity (cp) | 2.0 |
| Specific resistivity (ohm-cm) | 730 |
| Sonic velocity (m/sec) | 1233 |

EXAMPLE 2

Using the procedure described in Example 1, an ink composition is formulated as follows:

| | Parts by weight |
| --- | --- |
| Methanol | 425.7 |
| Methyl ethyl ketone | 307.0 |
| Ethyleneglycol methyl ether | 89.0 |
| Deionized water | 14.7 |
| Methyl ester of rosin | 13.5 |
| Styrene-acrylic acid copolymer (Joncryl 67) | 129.5 |
| Dimethylamine hydrochloride | 0.7 |
| Basic Violet 10 dye | 5.0 |
| Basic Violet 3 dye | 15.0 |
| Nonyl-phenoxypolyethoxy ethanol | 40.0 |

-continued

| | Parts by weight |
|---|---|
| surfactant (Triton N 101) | |

After filtering, the ink was found to have the following physical properties:

| | |
|---|---|
| pH | 2.2 |
| Viscosity (cp) | 2.1 |
| Specific resistivity (ohm-cm) | 650 |
| Sonic velocity (m/sec) | 1239 |

EXAMPLE 3

Using the procedure described in Example 1, an ink composition is formulated as follows:

| | Parts by weight |
|---|---|
| Methanol | 851.4 |
| Methyl ethyl ketone | 614.0 |
| Propyleneglycol methyl ether | 178.0 |
| Deionized water | 29.4 |
| Methyl ester of rosin | 27.0 |
| Styrene-acrylic acid copolymer (Joncryl 67) | 259.0 |
| Dimethylamine hydrochloride | 1.4 |
| Basic Violet 10 dye | 10.0 |
| Basic Violet 3 dye | 29.6 |

After filtering, the ink was found to have the following physical properties:

| | |
|---|---|
| pH | 2.0 |
| Viscosity (cp) | 2.1 |
| Specific resistivity (ohm-cm) | 800 |
| Sonic velocity (m/sec) | 1231 |

EXAMPLE 4

Using the procedure described in Example 1, an ink composition is formulated as follows:

| | Parts by weight |
|---|---|
| Methanol | 425.7 |
| Methyl ethyl ketone | 307.0 |
| Ethyleneglycol methyl ether | 89.0 |
| Deionized water | 14.7 |
| Methyl ester of rosin | 13.5 |
| Styrene-acrylic acid copolymer (Joncryl 67) | 129.5 |
| Dimethylamine hydrochloride | 0.7 |
| Basic Violet 10 dye | 5.0 |
| Basic Violet 3 dye | 15.0 |
| Gammamethacryloxy-propyltrimethoxy silane surfactant (A-174) | 20.0 |

After filtering, the ink was found to have the following physical properties:

| | |
|---|---|
| pH | 2.1 |
| Viscosity (cp) | 2.0 |
| Specific resistivity (ohm-cm) | 740 |
| Sonic velocity (m/sec) | 1241 |

EXAMPLE 5

Using the procedure described in Example 1, an ink composition is formulated as follows:

| | Parts by weight |
|---|---|
| Methanol | 373.7 |
| Methyl ethyl ketone | 272.4 |
| Ethyleneglycol methyl ether | 69.7 |
| Deionized water | 10.2 |
| Styrene-acrylic acid copolymer (Joncryl 67) | 96.0 |
| Dimethylamine hydrochloride | 0.5 |
| Basic Violet 10 dye | 6.2 |
| Basic Violet 3 dye | 18.0 |
| Rosin oil | 20.0 |

After filtering, the ink was found to have the following physical properties:

| | |
|---|---|
| pH | 2.0 |
| Viscosity (cp) | 2.4 |
| Specific resistivity (ohm-cm) | 600 |
| Sonic velocity (m/sec) | 1246 |

It will be understood that various changes and modifications can be made in the details of procedure, formulation and use without departing from the spirit of the invention, especially as defined in the following claims.

We claim:

1. An ink composition for use in ink jet printing consisting essentially of:
   (a) 5 to 25% by weight of a styrene-acrylic acid copolymer, said copolymer having a molar ratio of styrene to acrylic acid from 1 to about 4;
   (b) 0.5 to 8% by weight of a soluble dye;
   (c) a solvent system of a lower alkanol and a lower aliphatic ketone, said alkanol being present in an amount of 10 to 85% by weight, and said ketone being present in an amount of 10 to 60% by weight;
   (d) 0 to about 50% by weight of at least one evaporation retardant;
   said composition having a pH in the range of 1 to 7 and containing less than 5% by weight of water.

2. A composition as defined in claim 1 wherein the copolymer is prepared by using 1.5 to 2.5 moles of styrene for each mole of acrylic acid.

3. A composition as defined in claim 1 wherein the composition has a viscosity at 25° C. of 1 to 10 cp, a specific resistivity of 10–3000 ohm-cm and a sonic velocity of 1100 to 1400 m/sec.

4. A composition as defined in claim 1 wherein the composition also includes a modifier for said copolymer in an amount up to 15% by weight, said modifier being selected from the group consisting of rosin oils and rosin esters.

5. A composition as defined in claim 1 wherein the composition contains less than 2% by weight of water.

6. A composition as defined in claim 1 wherein the evaporation retardant is selected from the group consisting of glycol ethers, glycol esters and combinations thereof.

7. A composition as defined in claim 1 wherein the composition also includes up to 2% by weight of amine salt.

8. An ink composition for use in ink jet printing consisting essentially of:

(a) 5 to 25% by weight of a copolymer of styrene and an acid having the structure:

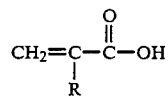

wherein R is hydrogen or an alkyl group containing 1 to 5 carbon atoms, said copolymer having a molar ratio of styrene to acid ranging from about 1 to about 4;

(b) 0.5 to 8% by weight of a soluble dye;
(c) a solvent system of a lower alkanol and a lower aliphatic ketone, said alkanol being present in an amount of 10 to 85% by weight, and said ketone being present in an amount of 10 to 60% by weight;
(d) 0 to about 50% by weight of at least one evaporation retardant;

said composition having a pH in the range of 1 to 7 and containing less than 5% by weight of water.

9. A composition as defined in claim 8 wherein the composition contains less than about 2% by weight water.

* * * * *